United States Patent
Muto et al.

[11] Patent Number: 6,158,225
[45] Date of Patent: Dec. 12, 2000

[54] AUTOMOTIVE AIR-CONDITIONING APPARATUS

[75] Inventors: Ikuo Muto; Shinichi Nomura, both of Narashino, Japan

[73] Assignee: Seiko Seiki Kabushiki Kaisha, Japan

[21] Appl. No.: 09/207,822

[22] Filed: Dec. 9, 1998

[30] Foreign Application Priority Data

Dec. 10, 1997 [JP] Japan .................................. 9-356330

[51] Int. Cl.[7] .................................. F25B 21/02
[52] U.S. Cl. .............................. 62/3.7; 62/244; 62/235.1
[58] Field of Search .................... 62/244, 3.7, 235.1, 62/236

[56] References Cited

U.S. PATENT DOCUMENTS

| | | | |
|---|---|---|---|
| 5,233,227 | 8/1993 | Kajimoto et al. | 307/9.1 |
| 5,277,038 | 1/1994 | Carr | 62/434 |
| 5,586,448 | 12/1996 | Ikeda et al. | 62/156 |
| 5,711,155 | 1/1998 | DeVibiss et al. | 62/3.7 |
| 5,762,129 | 6/1998 | Elliott | 165/48.1 |
| 5,927,077 | 7/1999 | Hisai et al. | 62/3.3 |
| 6,058,712 | 5/2000 | Rajasubramanian et al. | 62/3.6 |

*Primary Examiner*—William Doerrler
*Assistant Examiner*—Melvin Jones
*Attorney, Agent, or Firm*—Adams & Wilks

[57] ABSTRACT

To keep a temperature of an interior of an automotive vehicle at least at a level of an external atmospheric temperature even if the vehicle is parked with an engine being stopped for a long time, an automotive air-conditioning apparatus is composed of a cooling device 12 to be controlled by a controller 13, a pre-cooling device 20 for pre-cooling the interior of the vehicle, and a sub-controller 18 for controlling the pre-cooling device. The pre-cooling device is composed of a cooling thermoelectric element module 22, a ventilation fan 23, a solar battery 21 and a pre-cooling storage battery 24 charged by the solar battery. The sub-controller always operates the pre-cooling device 20 while the vehicle is stopped with the engine being stopped and starts the pre-cooling device 20, for example, one hour prior to a time when the vehicle starts to movement during parking for a long time in an interior parking lot or the like with the engine being stopped so that the temperature of the interior of the vehicle is kept at a temperature that does not so much exceed a set temperature, i.e., at least at the level of the external atmospheric temperature, until the engine is started.

21 Claims, 7 Drawing Sheets

AUTOMOTIVE AIR-CONDITIONING APPARATUS

BACKGROUND OF THE INVENTION

1. Field of the Invention

The present invention relates generally to an automotive air-conditioning apparatus, and more particularly, to an automotive air-conditioning apparatus having a cooling device driven by an automotive engine and a pre-cooling device driven by an energy source other than the automotive engine for pre-cooling an interior of a vehicle before the start of driving the vehicle.

2. Description of the Related Art

In general, an automotive air-conditioning apparatus is composed of a cooler incorporating a compressor driven by an engine. Accordingly, if the engine is stopped, the cooler is also stopped. On a very hot day in the heat of summer, the interior of a vehicle at rest with the engine being stopped reaches an excessively high temperature that greatly exceeds the external atmospheric temperature. This excessively high temperature may cause a variety of equipment or instruments in the interior of the vehicle to be broken down or deformed. Also, there is another problem in that, at the start of driving the vehicle, the steering wheel is to hot to grip, and even if the cooler is started, the interior temperature is hardly lowered, and is uncomfortable for the driver. Recently, for the purpose of preventing the global warming effect, the driver has been requested to stop the engine rather than allowing it to idle when the vehicle is at a temporary stop. However, most drivers would not stop the engine because the temperature of the interior of the vehicle would be abruptly elevated if the driver has stopped the engine even temporarily. In order to encourage the drive to stop the engine rather than allow it to idle, it is necessary for the interior of the vehicle to be maintained at a comfortable temperature while temporarily stopping the engine.

Japanese Utility Model Laid-Open No. Sho 58-136815 discloses an automotive air-conditioning apparatus having a cooling device driven by an engine and an auxiliary cooling device driven by an energy source other than the engine in order to meet the above-described demands. Namely, this conventional automotive air-conditioning apparatus is composed of a main cooling device driven by the engine and the auxiliary cooling device operated in the case where the engine is stopped or the air-conditioning driving ability by the engine output alone is insufficient so that a temperature of the interior of the vehicle becomes abnormally high. The auxiliary cooling device is provided with a solar battery in a light receivable portion of the vehicle. A thermoelectric element operated by the solar battery is provided in a duct. Further, a controller is provided for controlling the electric power supply to the thermoelectric element by detecting the external atmospheric temperature and the vehicle interior temperature and comparing those temperatures with the set temperatures.

This conventional automotive air-conditioning apparatus will no be described with reference to FIG. 4 which shows a circuit thereof. The vehicle interior is air-conditioned by the cooling device 20 while driving the engine during travel of the vehicle or even in a temporary stop of the vehicle. However, if the air-conditioning ability of the cooling device 20 is insufficient; the controller 30 turns on a switch S7 for supplying electric power from the solar battery 51 to the cooling thermoelectric element 52, thereby simultaneously performing cooling of the vehicle interior by the cooling device 20 and cooling thereof by the cooling thermoelectric element 52. During times when the vehicle engine is stopped, the controller 30 turns on the switch S7 to supply electric power from the solar battery 51, thereby air-conditioning the interior of the vehicle by only the cooling thermoelectric element 52. In this conventional automotive air-conditioning apparatus, in the sunshine, the cooling thermoelectric element 52 receives electric power from the solar battery 51 to air-condition the vehicle interior, thus functioning as an auxiliary cooling device. However, in the case where the vehicle is parked with the engine being stopped for a long period of time indoors or outdoors in the daytime in a cloudy or rainy day or at night in high summer, a sufficient amount of the electric power for driving the above-described auxiliary cooling device is not supplied by the solar battery. Accordingly the above-described auxiliary cooling device does not function as the cooler. Of course, a pre-cooling process for lowering the temperature of the interior of the vehicle at least down to the level of the external atmospheric temperature before starting the cooling device 20 to be driven by the engine 10 is not effected. Accordingly, in this conventional automotive air-conditioning apparatus, in the case where the vehicle is started after being parked for a long period of time, the temperature of the interior of the vehicle often greatly exceeds the external atmospheric temperature. Even if the cooling device is started, the temperature of the interior of the vehicle hardly lowers to the set temperature.

It is well known that, if ventilation is effected by a ventilation fan when the engine is off, the temperature of the interior of the vehicle is brought rather close to the external atmospheric temperature. According to some well-known data, in the case where the atmospheric temperature was about 30° C. under the sunshine in high summer, the temperature of the interior of a solar car which was parked for a long time in the exterior parking lot reached about 60° C. without ventilation, whereas the temperature was lowered down to about 45° C. with only the ventilation by the ventilation fan. Thus, it is well known that ventilation is very effective for lowering the interior temperature. The ventilation fan device driven by the solar battery has been put into practical use and is already available on the market. However, in the case where the vehicle is parked with the engine being stopped for a long period of time indoors or outdoors in the daytime in a cloudy or rainy day or at night in high summer, a sufficient amount of electric power is not supplied by the solar battery for the above-described conventional ventilation fan device. Therefore, such device could not function as a ventilation fan.

Japanese Utility Model Laid-Open No. Sho 60-102121 discloses an example of a conventional automotive air-conditioning device which uses a cooling thermoelectric element as a cooling device that is driven by an energy source other than an engine and a regular battery loaded on a vehicle. In this conventional device, a heat absorbing section or a heat irradiation section of the cooling thermoelectric element is provided in a passage for communicating air introduced from the exterior of the vehicle or from the interior of the vehicle. A thermoelectric converting element for an electric power source for converting heat into electricity is provided in an exhaust pipe mounted on the engine so that The electric power generated by the above-described thermoelectric converting element is fed to the above-described cooling thermoelectric element. However, since the function of an conventional device as the electric power source is considerably degraded when the engine is stopped, this device could not serve as the air-conditioning device for the vehicle when the engine is stopped.

Incidentally, the conventional cooling device to be driven by the engine uses Freon gas. The device is designed so that is is a prerequisite that the vehicle interior is to be rapidly cooled when the vehicle is exposed under the sunshine and the vehicle interior is kept at a very high temperature. Accordingly, the structural components such as a compressor, a condenser and an evaporator become large in size. In addition, a large amount of Freon gas is needed. Also in view of the depletion of the ozone layer and the global warming effect due to the Freon gas, it is necessary to miniaturize the structural components of the automotive air-conditioning apparatus provided with a cooling device driven by the engine. However, an air-conditioning apparatus which meets this requirement has not been yet realized.

SUMMARY OF THE INVENTION

The present invention has been made in view of the above-described circumstances, and therefore a first object of the present invention is to keep a temperature of an interior of a vehicle with an engine being stopped under the sunshine at least at a level of an external atmospheric temperature to thereby prevent a breakdown or deformation of equipment and instruments and avoid driver discomfort due to an excessively high temperature of the interior of the vehicle and to enhance a cooling efficiency in the case where a cooling device driven by the engine is started.

A second object of the invention is to provide an automotive air-condition apparatus for effectively cooling the vehicle interior so that the temperature of the vehicle interior rapidly reaches a set temperature by means a cooling device driven by the engine after parking for a long time by providing a pre-cooling function to keep the temperature of the vehicle interior at least at a level of the external atmospheric temperature even in case of parking with the engine stopped for a long period of time indoors or outdoors in the daytime in a cloudy or rainy day or at night in summer.

A third object of the invention is to provide an automotive air-conditioning apparatus provided with a pre-cooling function to cause the temperature of the vehicle interior to be lowered to the level of the external atmospheric temperature by utilizing solar energy.

A fourth object of the invention is to provide an automotive air-condition apparatus provided with a pre-cooling function for effectively lowering the temperature of the vehicle interior to the level of the external atmospheric temperature by utilizing solar energy.

A fifth object of the invention is to provide a pre-cooling device using a thermoelectric element module which may be operated by either electric power obtained by converting solar energy to electric energy or electric power obtained by converting thermal energy of exhaust gas of the engine to thermal energy in addition to the cooling device to be driven by the engine, thereby effectively operating the cooling device.

A sixth object of the invention is to miniaturize structural components of an automotive air-conditioning apparatus provided with a cooling device to be driven by the engine.

In order to attain these and other objects, an automotive air-conditioning apparatus is composed of a cooling device to be driven by an engine, a controller for controlling the cooling device, a pre-cooling device to be driven by an energy source other than the engine for pre-cooling an interior of an automotive vehicle, and a sub-controller for controlling the pre-cooling device. Then pre-cooling device includes a cooling thermoelectric element module for cooling the interior of the vehicle, a ventilation fan for discharging air in the interior of the vehicle to the outside and a solar battery for feeding electric power to the cooling thermoelectric element module and the ventilation fan and the sub-controller performs a pre-cooling control in which the ventilation fan is made to operate in the case where the temperature of the interior of the vehicle is equal to or higher than a first set temperature, and the cooling thermoelectric element module is made to operate in the case where the temperature of the interior of the vehicle is equal to or higher than a second set temperature.

Also, the pre-cooling device is composed of the cooling thermoelectric element module for cooling the interior of the vehicle, the ventilation fan for discharging the air within the interior of the vehicle to the outside, the solar battery for feeding the electric power to the cooling thermoelectric element module and the ventilation fan and a pre-cooling storage battery to be charged by the solar battery, and the sub-controller performs a pre-cooling control in which the ventilation fan is made to operate in the case where the temperature of the interior of the vehicle is equal to or higher then the first set temperature, the cooling thermoelectric element module is made to operate in the case where the temperature of the interior of the vehicle is equal to or higher than the second set temperature that is higher than the first set temperature, and further the cooling thermoelectric element module is made to operate by the electric power from the pre-cooling storage battery in the case where a cooling ability is insufficient with the electric power from the solar battery. Then, the sub-controller performs a pre-cooling control in which the ventilation fan and the cooling thermoelectric element module are driven by the pre-cooling storage battery at a designated time before starting movement of the vehicle in the case where the vehicle is parked for a long time with the engine being stopped under the condition that the electric power of the solar battery is insufficient.

Also, the pre-cooling device is composed of a cooling thermoelectric element module for cooling the interior of the automotive vehicle, a ventilation fan for ventilating the interior of the vehicle, a first electric power source composed of a solar battery disposed in a solar ray receivable portion of the vehicle for converting solar energy to electric energy, a second electric power source composed of an electric power source thermoelectric converting element module disposed in a passage of exhaust gas of the vehicle engine for converting thermal energy to electric energy, and a third electric power source composed of a pre-cooling storage battery charged by the solar battery and/or the thermoelectric converting element module. The sub-controller performs a pre-cooling control composed of a power supply control to the cooling thermoelectric element module and the ventilation fan and an electric power source selection control to selectively use any of the first to third electric power sources as an electric power source on the basis of temperatures of the interior and the exterior of the vehicle and a vehicle movement condition. In the case where the electric power of the first and/or second electric power sources is insufficient to cool, the sub-controller performs the electric power source selection control for feeding the electric power from the third electric power source. Then, the sub-controller performs a pre-cooling control to drive the ventilation fan and the cooling thermoelectric element module by the third electric power source at a designated time before starting movement of the vehicle in the case where the vehicle is stopped for a long time with the engine being stopped under the condition that the electric power of the solar battery is insufficient.

DESCRIPTION OF THE PREFERRED EMBODIMENTS

The present invention will now be described with reference to the accompanying drawings.

An automotive air-conditioning apparatus according to embodiments of the present invention is composed of a cooling device to be driven by an engine, a controller for controlling the above-described cooling device, a pre-cooling device to be driven by an energy source other than the engine for pre-cooling an interior of an automotive vehicle, and a sub-controller for controlling the above-described pre-cooling apparatus and may be installed in any vehicle such as a passenger car, a bus, and a truck.

Figure 1:
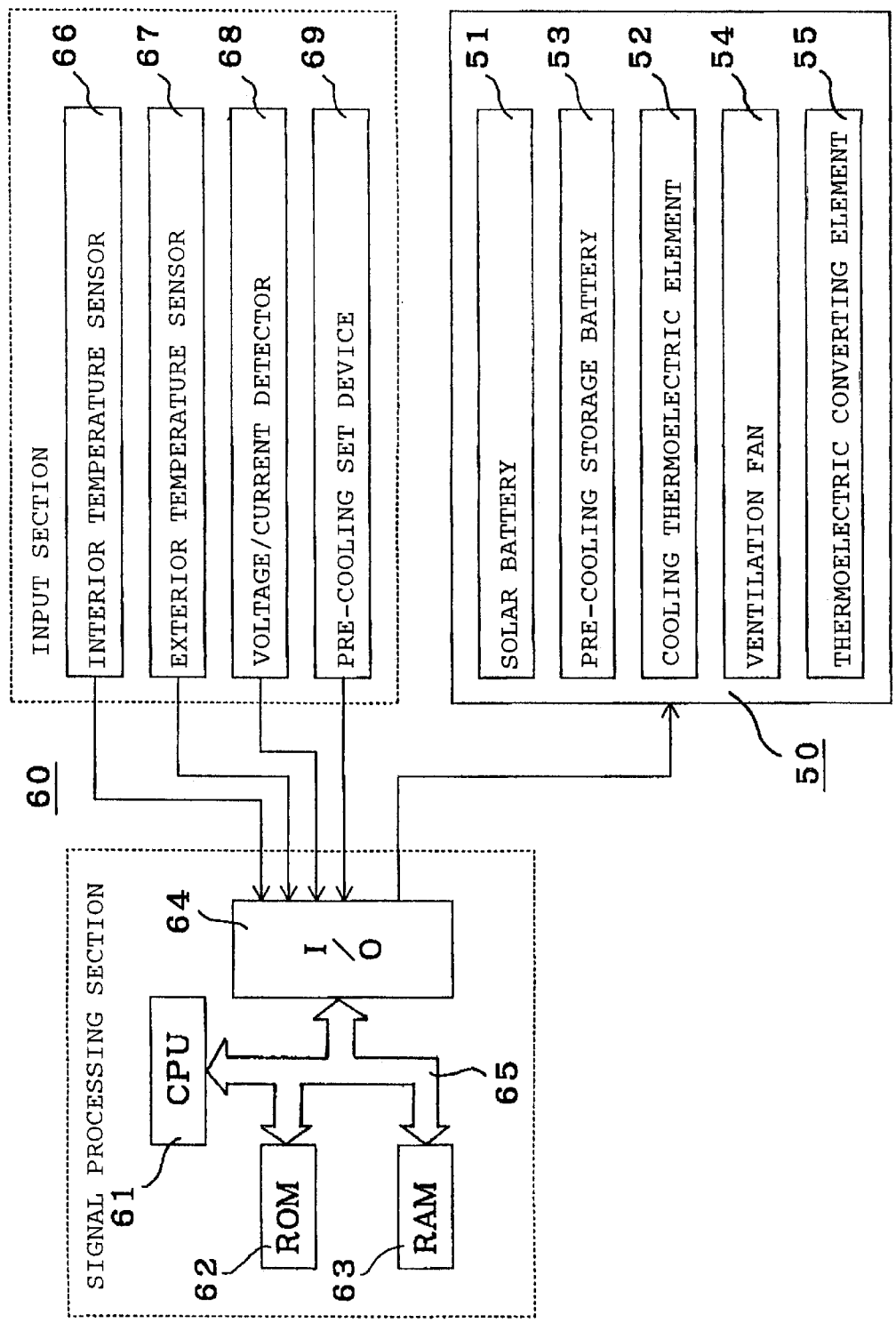
FIG. 1 is a block diagram showing structures of a pre-cooling device and a sub-controller which are a primary part of an automotive air-conditioning apparatus according to the present invention.

A primary part of the automotive air-conditioning apparatus according to the present invention is composed of the pre-cooling device 50 and the sub-controller 60. FIG. 1 is a block diagram showing a structure of the primary part according to one embodiment of the invention. In FIG. 1, the pre-cooling device 50 is composed of a cooling thermoelectric element module 52, a ventilation fan 54, a solar battery 51 that is a first electric power source, an electric power source thermoelectric converting element module 55 that is a second electric power source, and a pre-cooling storage battery 53 that is a third electric power source. The cooling thermoelectric element module 52 is composed of a cooling section including a heat absorbing end and a heat irradiation section including a heat generating end. The cooling section and the heat irradiation section are located inside and outside of the vehicle, respectively. The ventilation fan 54 serves to discharge heated air within the interior of the vehicle, to the exterior of the vehicle. The ventilation fan 54 is disposed on a suitable wall surface of the vehicle interior. The solar battery 51 may be a commercially available solar battery panel and is disposed at a place where the sunshine is easily received without any obstruction, such as a roof portion or the like of the automotive vehicle. The pre-cooling storage battery 53 may be, for example, a lead storage battery, a nickel/hydrogen storage battery, a storage battery in which capacitors having large capacities are connected in series, or the like.

The sub-controller 60 is composed of a signal processing section and an input section. The signal processing section includes a CPU 61 that is a central processing unit for calculating signals and processing signals needed for controlling the pre-cooling device 50, a ROM 62 for storing a control program and the like, a RAM 63 for temporarily storing data or the like, an I/O interface 64 which is an input/output port, and a bus 65 for connecting these structural components. Also, the input section is composed of an interior temperature sensor 66, an exterior temperature sensor 67, a voltage/current detector 68 for detecting a charged condition of the pre-cooling storage battery 53, and a pre-cooling set device 69. The pre-cooling set device 69 includes a pre-cooling start setting means for setting the start of pre-cooling in accordance with a scheduled movement start time for the vehicle or the like and an engine start/stop information inputting means. A movement start time setting means is provided for setting a movement start time of the vehicle after parking for a long time. Also, the engine start/stop information inputting means is a means for responding to the pre-cooling start after the temporary stop of the vehicle and for inputting information of start/stop of the engine utilizing, for example, an engine key or a tachometer, into the sub-controller 60 or the signal processing section.

The sub-controller 60 performs the pre-cooling control so as to operates the ventilation fan 54 in the case where the temperature of the interior of the vehicle is equal to or higher than a first set temperature, to operate the cooling thermoelectric element module 52 in the case where the temperature of the interior of the vehicle is equal to or higher than a second set temperature, and to operate the cooling thermoelectric element module 52 by the electric power from the pre-cooling storage battery 53 in the case where the electric power from the solar battery 51 is insufficient to cool. The case where the electric power from the solar battery 51 is insufficient to cool means a case where it is impossible to obtain a sufficient electric power from the solar battery 51 when the vehicle is parked indoors or outdoors in a cloudy or rainy day, or a case where the cooling ability by the cooling thermoelectric element module 52 is insufficient even with the electric power of the solar battery under the sunshine when the exterior atmospheric temperature is too high, or the like.

Figure 2:
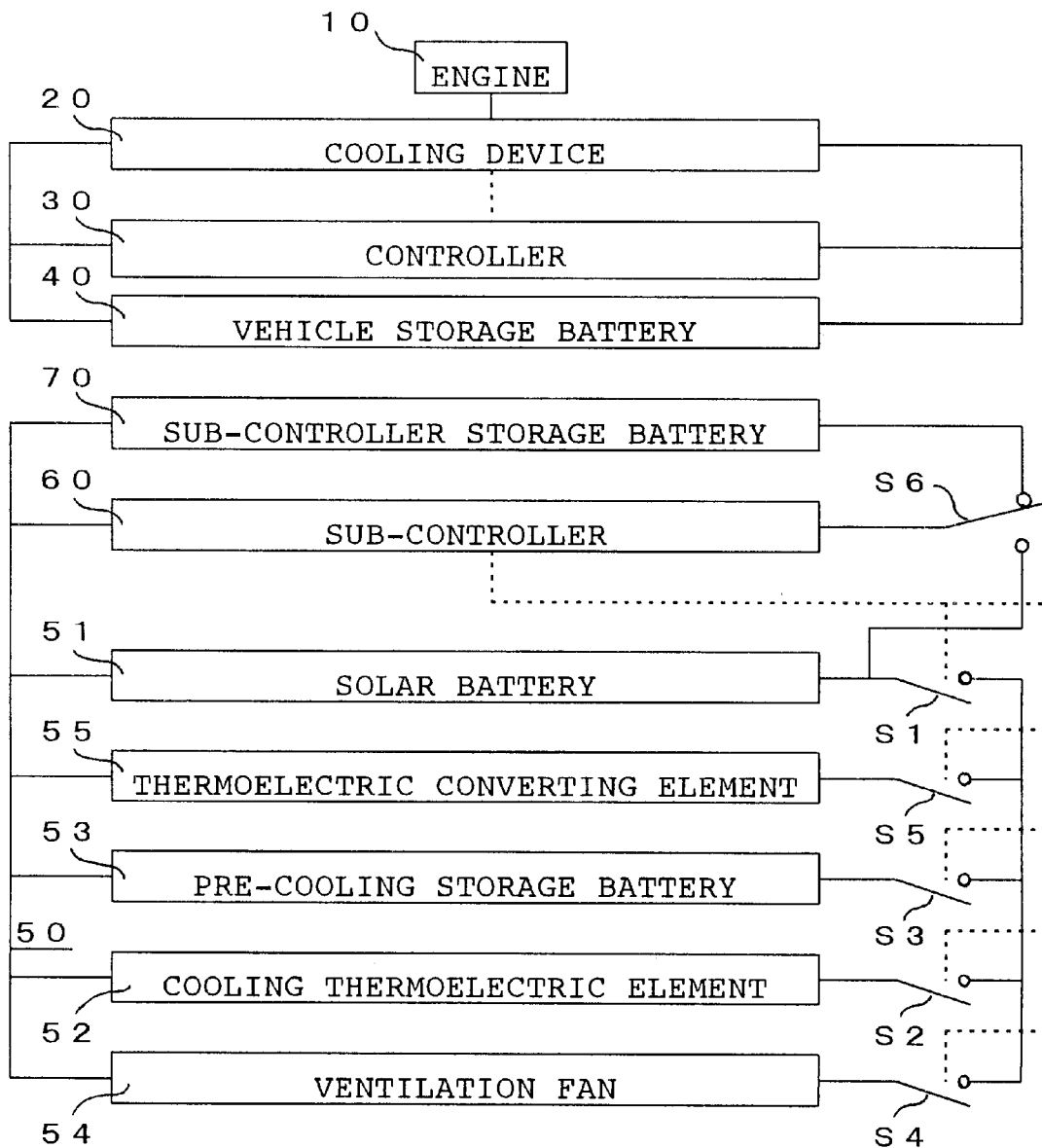
FIG. 2 is a circuit diagram for an automotive air-conditioning apparatus according to an embodiment of the invention.

The driving electric power for the sub-controller 60 is supplied by a sub-controller storage battery 70 which is independent of a vehicle storage battery 40 that is a common electric power source for the various equipment and instruments of the vehicle as shown in FIG. 2. This is because it is not preferable to sue the vehicle storage battery 40 as the electric power source for the sub-controller 60 which has to be operated even in the case where the vehicle is stopped or parked with the engine 10 being stopped for a long time under the condition that the sunshine is insufficient or absent, which may cause a risk of excessive discharge. Under the condition that the solar battery 51 works, the solar battery 51 that is the electric power source for the pre-cooling device 50 is used as the electric power source for the sub-controller 60. Except for this condition, the sub-controller storage battery 70 is used for the electric power source of the sub-controller 60. Incidentally, in case of vehicle travel such as usual travel, a temporary stop or parking for a short time, it is possible to incorporate the function of the above-described sub-controller 60 into the function of the controller 30 of the cooling device 20 to be driven by the engine 10. In this case, the driving electric power may be fed from the vehicle storage battery 40 to the above-described sub-controller 60.

Figure 5:
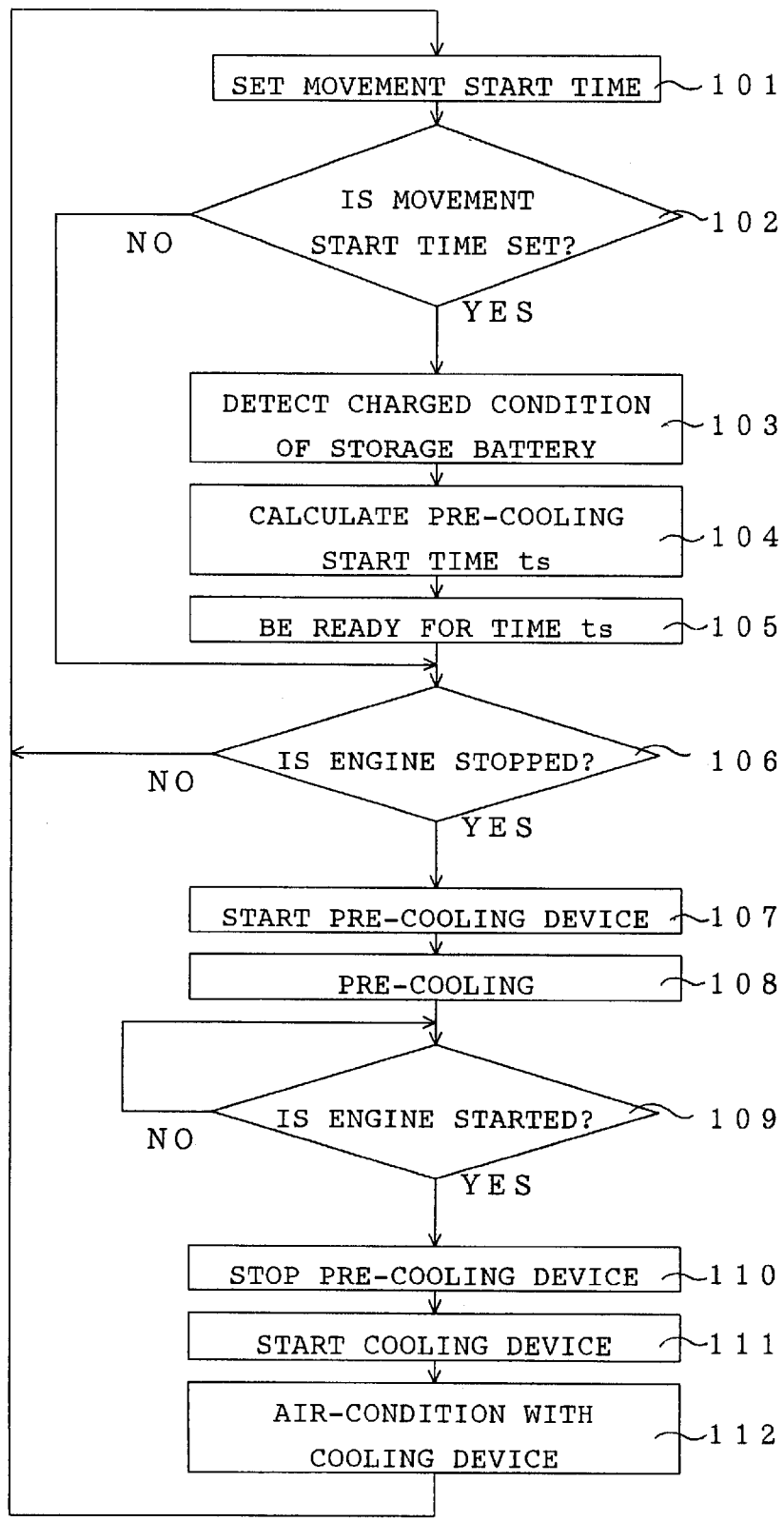
FIG. 5 is a flowchart showing an operation of an automotive air-conditioning apparatus according to the invention.

A pre-cooling control operation in case of parking for a long time is performed in accordance with a flowchart shown in FIG. 5. A pre-cooling setting is performed by the pre-cooling set device 69 shown in FIG. 1 before the stop of the engine. The pre-cooling setting is a scheduled vehicle movement time setting after parking for a long time (step 101). The signal processing section of the sub-controller 60 periodically checks whether or not the scheduled vehicle movement time setting is effected (step 102). In case of parking for a long time, if the vehicle movement start time is set, the operation proceeds to a step 103 after the step 102. The signal processing section of the sub-controller 60 inputs the information concerning the charged condition of the pre-cooling storage battery 53 from the voltage/current detector 68 in step 103 and detects the charged condition of the pre-cooling storage battery 53. In the next step 104, a pre-cooling start time is is calculated on the basis of the above-described charged condition. The operation is ready for the pre-cooling start time ts (step 105). At the pre-cooling start time ts, the signal processing section of the sub-controller 60 checks whether or not the engine is stopped on the basis of the engine start/stop information from the pre-cooling set device 69 (step 106). If the engine has already been started, the information concerning the pre-cooling start time ts is reset, and the operation is returned back to the movement start time setting step 101. If the engine is stopped, the operation proceeds to a step 107, the pre-cooling device 50 is started to perform the pre-cooling (step 108). The signal processing section of the sub-controller 60 periodically checks whether or not the engine is started on the basis of the engine start/stop information from the pre-cooling set device 69 (step 109). When the engine is started, the sub-controller 60 stops the pre-cooling device 50 (step 110), subsequently starts the cooling device 20 (step 111), and thereafter performs the air-conditioning by the cooling device 20 (step 112). Then, the operation is returned back to the movement start time setting step 101.

Figure 6:
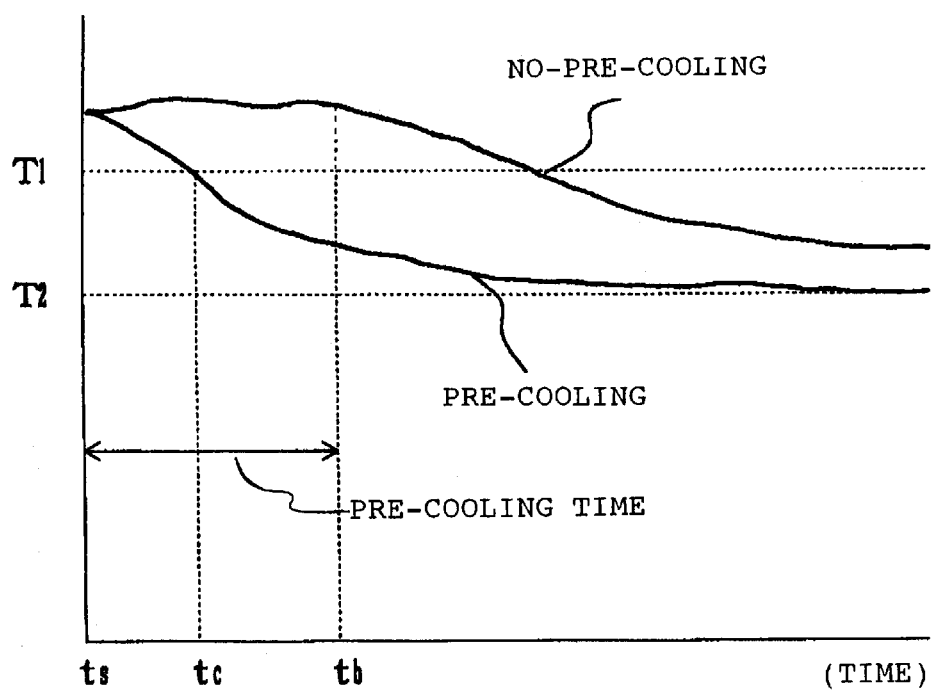
FIG. 6 is a graph showing an example of an effect of the pre-cooling control in case of parking for a long time.

The temperature change of the interior of the vehicle will be described with reference to FIG. 6 showing an example of an effect of the pre-cooling control in case of parking for a long time. The sub-controller 60 starts the pre-cooling device 50 at the time ts. At this time, since the temperature T of the vehicle interior exceeds the first set temperature T1, the ventilation fan 54 is started. The temperature T of the vehicle interior is gradually lowered by the ventilation. Then, the cooling thermoelectric element module 52 is started at time tc when the temperature T reaches the first set temperature T1. Thus, the cooling is effected by the Peltier effect. By this cooling effect, the temperature of the vehicle interior is further lowered and may be kept at least at the level of the external atmospheric temperature. When the engine 10 is started at time tb, the operation of the pre-cooling device 50 is stopped, and the cooling device 20 is started so that the temperature T of the vehicle interior reaches the second set temperature T2 in a short period of time. The period of time from time ts to time tb is the pre-cooling period.

The pre-cooling start setting is to set the scheduled movement start time by operating a pre-cooling setting button or the like of the pre-cooling set device 69 of the sub-controller 60 by the driver in case of parking for a long time. It is also possible to set the pre-cooling operation by automatically calculating the pre-cooling start time, i.e., the pre-cooling device start time ts without depending upon the scheduled movement start time.

Figure 7:
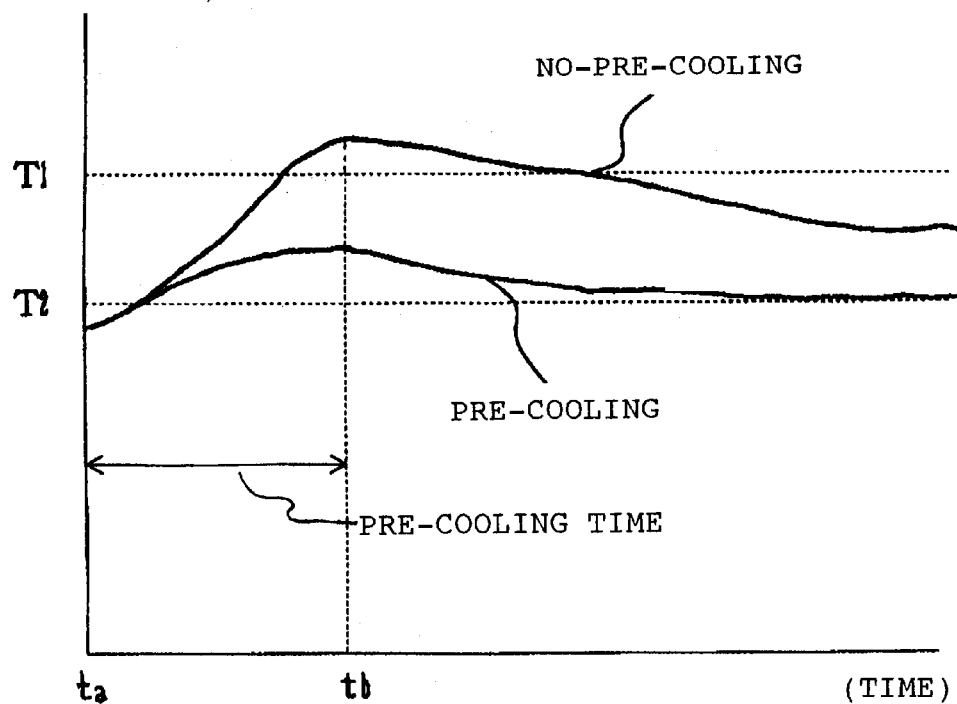
FIG. 7 is a graph showing an example of an effect of the pre-cooling control in case of a temporary stop.

In case of a temporary stop, there is no pre-cooling setting. In the flowchart shown in FIG. 5, the operation proceeds from step 102 to step 106. The sub-controller 60 immediately starts the pre-cooling device 50. Thereafter, the control in accordance with the steps 107 to 112 described in conjunction with the case of parking for a long time will be performed. The temperature change of the vehicle interior will be seen with reference to FIG. 7 which shows an example of the effect by the pre-cooling control in case of temporary stop. The engine 10 is stopped at time ta, and the air-conditioning by the cooling device 20 is stopped. Then, the sub-controller 60 starts the pre-cooling device 50. The temperature T of the vehicle interior is gradually elevated. When the temperature T reaches the second set temperature T2, the cooling thermoelectric element 62 is started to perform the cooling by the Peltier effect. By this cooling function, the elevation rate of the temperature of the vehicle interior is suppressed and may be kept below the external atmospheric temperature for a short period of time. When the engine 10 is started at time tb, the operation of the pre-cooling device 50 is stopped, and the cooling device 20 is started so that the temperature T of the vehicle interior quickly reaches the set temperature T2. The period from time ta to time tb is the pre-cooling period.

EMBODIMENT

A circuit for the automotive air-conditioning apparatus according to the present invention will now be described with reference to FIG. 2. The circuit includes the engine 10, the cooling device 20 driven by the engine 10, the controller 30 for controlling the cooling device 20 and the automotive storage battery 40 for supplying electric power to the cooling device 20, the controller 30 and other equipment needed for movement of the vehicle. Reference numeral 50 denotes the pre-cooling device for performing the pre-cooling, which is composed of the solar battery 51, the cooling thermoelectric element module 52, the pre-cooling storage battery 53, the ventilation fan 54 and the thermoelectric converting element module 55 for an electric power source. The solar battery 51 which is the first electric power source is connected to the cooling thermoelectric element module 52 through switches S1 and S2 and to the ventilation fan 54 through switches S1 and S4, respectively. The thermoelectric converting element module 55 which is the second electric power source is connected to the cooling thermoelectric element module 52 through switches S5 and S2 and to the ventilation fan 54 through switches S5 and S4, respectively. The pre-cooling storage battery 53 which is the third electric power source is connected to the cooling thermoelectric element module 52 through switches S3 and S2 and to the ventilation fan 54 through switches S3 and S4, respectively. The solar battery 51 is also connected to the pre-cooling storage battery 53 through switches S1 and S3. In the same manner, the thermoelectric converting element module 55 is also connected to the pre-cooling storage battery 53 through switches S5 and S3. The sub-controller 60 selectively opens and closes the switches S1 to S5 to control the pre-cooling device 50. The sub-controller 60 is switched and connected to either sub-controller electric power source 70 or the solar battery 51 by a switch S6.

Figure 3:
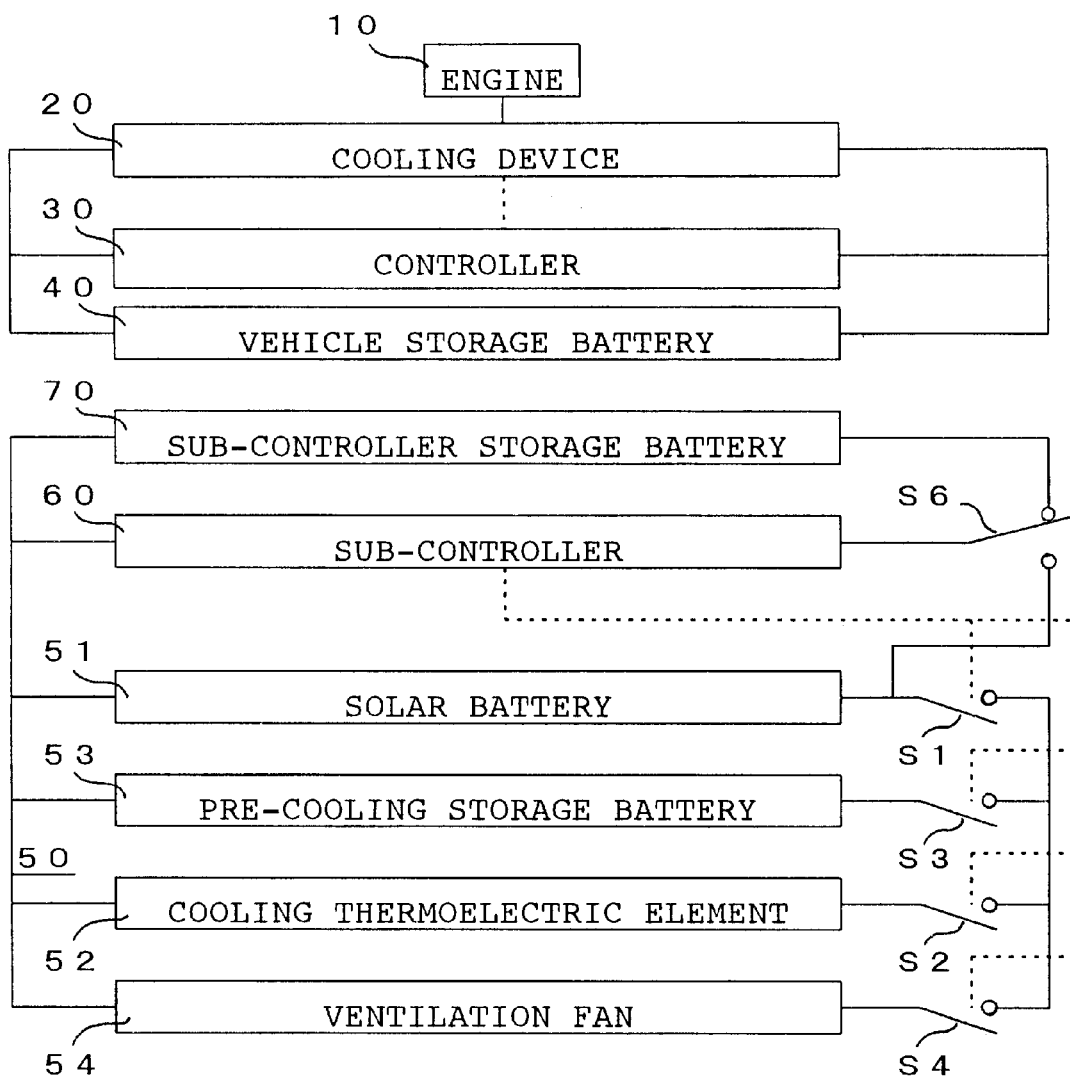
FIG. 3 is a circuit diagram for an automotive air-conditioning apparatus according to another embodiment of the invention.
Figure 4:
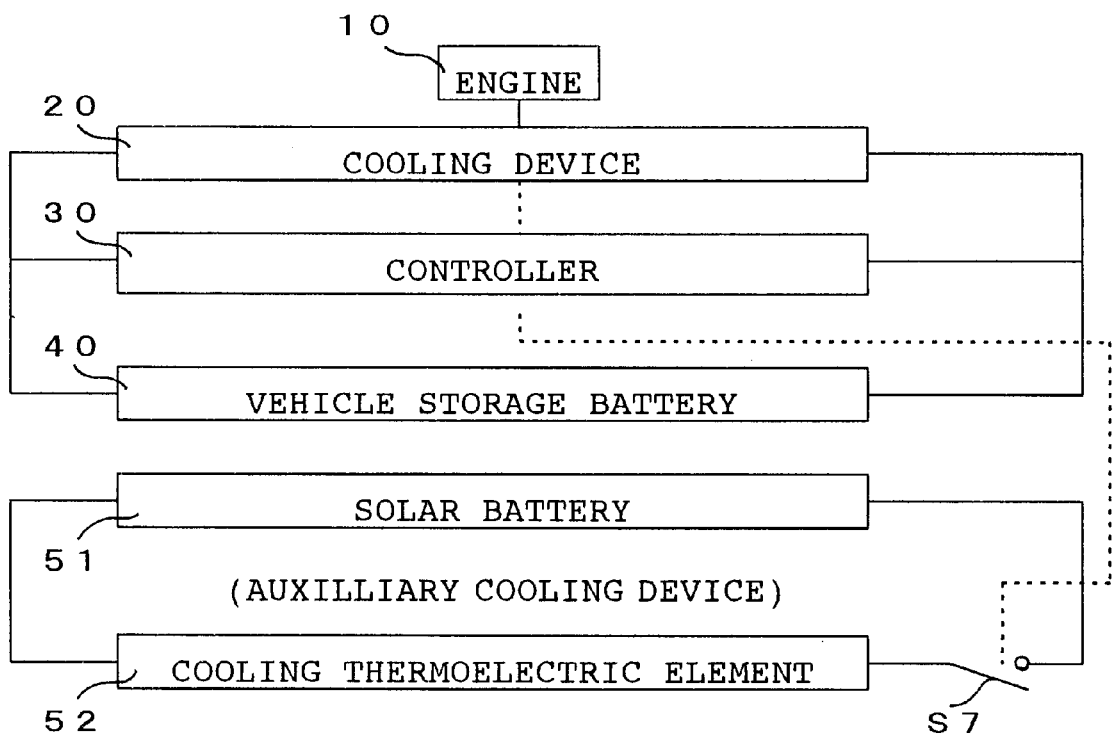
FIG. 4 is a circuit diagram showing a conventional automotive air-condition apparatus.

FIG. 3 shows another example of a circuit for the automotive air-conditioning apparatus according to the present invention. The circuit is fabricated by removing, from the circuit shown in FIG. 2, the thermoelectric converting element module 55 disposed in the passage of the exhaust gas of the engine for converting the thermal energy to the electric energy and the switch S5 for the thermoelectric converting element module 55. Although not shown in the drawings, still another example of a circuit for the automotive air-conditioning apparatus according to the present invention may be fabricated by removing, from the circuit shown in FIG. 2, the pre-cooling storage battery 53 and the switch S3 in addition to the thermoelectric converting element module 55 and the switch S5. In these embodiments, needless to say, the input section and the signal processing section of the sub-controller 60 are changed mutatis mutandis. Depending upon the vehicle or the environmental condition to which the present invention is applied, it is practically useful to apply the automotive air-conditioning apparatus provided with such a pre-cooling device and such a sub-controller.

The pre-cooling device 50 of the automotive air-conditioning apparatus according to the present invention performs the pre-cooling control for driving the ventilation fan 54 and the cooling thermoelectric element module 52 by the electric power from the pre-cooling storage battery 53 at a designated time ts before the start of vehicle movement in the case where the vehicle is parked for a long time with the engine being stopped under the condition that the electric power of the solar battery 51 is not sufficient (step 108 in the flowchart shown in FIG. 5). This pre-cooling control is performed by the signal processing section of the sub-controller 60 to turn on the switch S3, and to turn the switch S2 and the switch S4 on and off on the basis of the temperature of the vehicle interior and the set temperatures.

The sub-controller 60 inputs from the input section to the signal processing section the temperature information of the interior and exterior of the vehicle and the information concerning the vehicle movement such as the vehicle movement condition, i.e., the temporary stop, the parking for a long time or the like and performs the necessary signal processing to thereby perform, on the basis of the processing result, the electric power supply control to the cooling thermoelectric element module 52 and the ventilation fan 54 and the electric power source selection control for selectively using as the electric power source any one of the solar battery 51 which is the first electric power source, the thermoelectric element module 55 which is the second electric power source and the pre-cooling storage battery 53 which is the third electric power source. The electric power supply control and the electric power source selection control are performed by turning the switches S1 to S5 on and off.

According to the present invention, since the automotive air-conditioning apparatus is composed of a cooling device driven by the engine, the controller for controlling the cooling device, the pre-cooling device driven by an energy source other than the engine for pre-cooling the interior of the vehicle and the sub-controller for controlling the above-described pre-cooling device, the temperature of the vehicle interior upon the vehicle movement start may be kept at least at the level of the external atmospheric temperature by action of the pre-cooling device, of course, in the case where the vehicle is stopped temporarily or even when the vehicle is parked for a long time with the engine being stopped under the condition that the amount of the sunshine is insufficient or there is no sunshine. Accordingly, it is possible to prevent the temperature of the vehicle interior from being elevated abnormally. Also, according to the present invention, in the case where the vehicle is parked with the engine being stopped for a long time indoors or outdoors in a cloudy or rainy day, the sub-controller causes the ventilation fan and the cooling thermoelectric element module to be driven by the pre-cooling storage battery charged in advance by the solar battery or the electric power source thermoelectric converting module at a designated time before the vehicle movement start to thereby pre-cool the interior of the vehicle. Accordingly, the temperature of the vehicle interior is lowered at the level of the external atmospheric temperature upon the vehicle movement start and the cooling device may be operated effectively. Also, in case of a temporary stop, the same effect is ensured.

In the automotive air-conditioning apparatus according to the present invention, the pre-cooling control is effected by the pre-cooling device to thereby dispense with the necessity to effect the rapid cooling by the cooling device. Accordingly, it is possible to miniaturize the structural components of the cooling device. In brief, a large cooling capacity under the prerequisite condition of the very high temperature under the sunshine is no longer needed. Therefore, the weight and dimensions of the cooling device designed and manufactured with a small cooling ability, the consumption amount of the Freon gas, and the costs therefor are reduced. Accordingly, the weight, costs and dimensions of the automotive air-conditioning apparatus including the pre-cooling device according to the present invention may be reduced in comparison with the conventional system.

The thermoelectric converting element for generating the electric power by utilizing the thermal energy of the exhaust gas of the engine and the solar battery for generating the electric power by utilizing the solar energy are used as the electric power source of the pre-cooling device, the electric power from these electric power sources is stored in the pre-cooling storage battery which may be charged/discharged when these electric power sources are not used for cooling, and the electric power is fed to the pre-cooling device from the pre-cooling storage battery in response to the situation. Accordingly, it is possible to effectively utilize the energy and to enhance the pre-cooling effect of the pre-cooling device.

Various details of the invention may be changed without departing from its spirit or its scope. Furthermore, the foregoing description of the embodiments according to the present invention is provided for the purpose of illustration only, and not for the purpose of limiting the invention as defined by the appended claims and their equivalents.

What is claimed is:

1. In an air-conditioning apparatus for cooling an internal passenger chamber of an automotive vehicle having a cooling device driven by an engine of the vehicle, a controller for controlling the cooling device, a pre-cooling device driven by an energy source other than the engine for pre-cooling the interior passenger chamber of the vehicle, and a sub-controller for controlling the pre-cooling device, the improvement wherein:

the pre-cooling device comprises a cooling thermoelectric element module for cooling the interior passenger chamber of the vehicle, a ventilation fan for discharging air from the interior passenger chamber of the vehicle to the outside thereof, and a solar battery for supplying electric power to the cooling thermoelectric element module and the ventilation fan; and the sub-controller includes means for performing a pre-cooling control operation during which the ventilation fan is made to operate to reduce the temperature in the interior passenger chamber of the vehicle when the temperature of the interior passenger chamber of the vehicle is equal to or higher than a first set temperature, and the cooling thermoelectric element module is made to operate to reduce the temperature in the interior passenger chamber of the vehicle when the temperature of the interior passenger chamber of the vehicle is equal to or higher than a second set temperature.

2. An air-conditioning apparatus according to claim 1; wherein the pre-cooling device comprises the cooling thermoelectric element module for cooling the interior passenger chamber of the vehicle, the ventilation fan for discharging air from within the interior passenger chamber of the vehicle to the outside thereof of reduce the temperature inside the passenger chamber, and the solar battery for supplying electric power to the cooling thermoelectric element module and the ventilation fan, and further comprises a pre-cooling storage battery charged by the solar battery; and the sub-controller includes means for performing a pre-cooling control operation during which the ventilation fan is made to operate when the temperature of the interior passenger chamber of the vehicle is equal to or higher than the first set temperature, the cooling thermoelectric element module is made to operate when the temperature of the interior passenger chamber of the vehicle is equal to or higher than the second set temperature, and the cooling thermoelectric element module is driven by electric power supplied by the pre-cooling storage battery when cooling of the passenger chamber is insufficient using only the electric power from the solar battery.

3. An automotive air-conditioning apparatus according to claim 1; wherein the sub-controller includes means for performing a pre-cooling control operation in which the ventilation fan and the cooling thermoelectric element module are driven by electric power from the pre-cooling storage battery at a designed time before starting of the engine of the vehicle when the vehicle is parked for a long period of time with the engine stopped and cooling of the passenger chamber is insufficient using only electric power output by the solar battery.

4. In an air-conditioning apparatus for cooling an interior passenger chamber of an automobile having a cooling device driven by an engine of the automobile, a controller for controlling the cooling device, a pre-cooling device driven by an electric power source for pre-cooling the interior passenger chamber of the automobile, and a sub-controller for controlling the pre-cooling device, the improvement wherein:

the pre-cooling device comprises a cooling thermoelectric element module for cooling the interior passenger chamber of the automobile, a ventilation fan for ventilating the interior passenger chamber of the automobile, a first electric power source comprising a solar battery disposed in a portion of the vehicle exposed to solar energy for converting the solar energy into electric energy, a second electric power source comprising a thermoelectric converting element module disposed in a portion of the automobile through which exhaust gas passes for converting thermal energy of the exhaust gas into electric energy, and a third electric power source comprising a pre-cooling storage battery charged by at least one of the solar battery and the thermoelectric converting element module; and the sub-controller includes means for performing a pre-cooling control operation comprising a power supply control step to select at least one of the cooling thermoelectric element module and the ventilation fan to cool the interior passenger chamber and an electric power source selection control step to select at least one of the first to third electric power sources as an electric power source on the basis of temperatures of the interior and the exterior of the vehicle and a vehicle movement condition.

5. An automotive air-conditioning apparatus according to claim 4; wherein the sub-controller includes means for performing a pre-cooling control operation during which the ventilation fan and the cooling thermoelectric element module are driven by the third electric power source at a designated time before starting of the vehicle engine when the vehicle has been stopped for an extended period of time with the engine turned off and the electric power of said solar battery is insufficient.

6. An air-conditioning apparatus for cooling a passenger chamber of an engine-driven automobile, comprising: a cooling device comprising a cooling thermoelectric element module for cooling the passenger chamber and a ventilation fan for discharging air from the passenger chamber; control means for turning on the ventilation fan to reduce the temperature in the passenger chamber of the vehicle when the temperature therein is equal to or higher than a first preset temperature, and turning on the cooling thermoelectric element module to reduce the temperature in the passenger chamber of the vehicle when the temperature therein is equal to or higher than a second preset temperature; and at least one power source other than the automobile engine or a battery used to start the automobile engine for driving the ventilation fan and the cooling thermoelectric element module.

7. An air-conditioning apparatus according to claim 6; wherein the cooling thermoelectric element module has a cooling section comprising a heat absorbing end disposed within an interior of the automobile for absorbing heat within the interior, and a heat irradiation section comprising a heat generating end disposed outside the interior of the automobile to irradiate the absorbed heat outside the interior.

8. An air-conditioning apparatus according to claim 6; wherein the first preset temperature is equal to the ambient temperature outside the automobile and the second preset temperature is higher than the first preset temperature, so that the ventilation fan is turned on to maintain the temperature of the passenger chamber at the ambient temperature outside the automobile, and the cooling thermoelectric element module is turned on when the ventilation fan is unable to maintain the passenger chamber at the ambient temperature outside the automobile.

9. An air-conditioning apparatus according to claim 6; wherein the control means further comprises means for performing a pre-cooling operation when the engine of the automobile is turned off, in which the ventilation fan is turned on to reduce the temperature in the passenger chamber of the vehicle when the temperature therein is equal to or higher than the first preset temperature, and the cooling thermoelectric element module is turned on to reduce the temperature in the passenger chamber of the vehicle when the temperature therein is equal to or higher than the second preset temperature.

10. An air-conditioning apparatus according to claim 9; wherein the first preset temperature is equal to the ambient temperature outside the automobile and the second preset temperature is higher than the first preset temperature, so that the ventilation fan is turned on to maintain the temperature of the passenger chamber of the automobile at the ambient temperature outside the automobile, and the cooling thermoelectric element module is turned on when the ventilation fan is unable to maintain the passenger chamber at the ambient temperature outside the automobile.

11. An air-conditioning apparatus according to claim 6; wherein the cooling device is driven exclusively by the at least one power source.

12. An air-conditioning apparatus according to claim 11; wherein the at least one power source comprises a solar battery.

13. An air-conditioning apparatus according to claim 12; further comprising a storage battery charged by the solar battery.

14. An air-conditioning apparatus according to claim 13; wherein the cooling thermoelectric element module is driven by the storage battery when cooling of the passenger chamber is insufficient using only the electric power generated by the solar battery.

15. An air-conditioning apparatus according to claim 13; wherein the control means further comprises means for performing a pre-cooling control operation when the engine of the vehicle is off, in which the ventilation fan and the cooling thermoelectric element module are driven by electric power produced by the storage battery at a designed time before starting of the engine when the automobile has been parked for an extended period of time and cooling of the passenger chamber is insufficient using only electric power output by the solar battery.

16. An air-conditioning apparatus according to claim 13; further comprising a thermoelectric converting element disposed in an exhaust gas passage of the automobile for converting heat of the exhaust gas into electricity for charging the storage battery.

17. An air-conditioning apparatus according to claim 6; wherein the cooling device is driven by the automobile engine when the engine is turned on, and is driven by the at least one power source when the engine is turned off.

18. An air-conditioning apparatus according to claim 17; wherein the at least one power source comprises a solar battery.

19. An air-conditioning apparatus according to claim 18; further comprising a storage battery charged by the solar battery.

20. An air-conditioning apparatus according to claim 6; wherein the cooling device further comprises an automotive air-conditioning device driven by the automobile engine.

21. An air-conditioning apparatus according to claim 20; wherein the cooling thermoelectric element module and the ventilation fan are driven to cool the passenger chamber of the automobile when the automobile engine is turned off and the automotive air-conditioning device is driven to cool the passenger chamber when the engine is turned on.

\* \* \* \* \*